(12) United States Patent
Matsuoka et al.

(10) Patent No.: US 7,468,697 B2
(45) Date of Patent: Dec. 23, 2008

(54) SELF-SURVEYING WIDEBAND GROUND TRANSMITTERS

(75) Inventors: Masayoshi Matsuoka, Santa Clara, CA (US); Kurt R. Zimmerman, Mountain View, CA (US); Paul Y. Montgomery, Menlo Park, CA (US); David G. Lawrence, Santa Clara, CA (US)

(73) Assignee: Novariant, Inc., Menlo Park, CA (US)

( * ) Notice: Subject to any disclaimer, the term of this patent is extended or adjusted under 35 U.S.C. 154(b) by 51 days.

(21) Appl. No.: 11/499,827

(22) Filed: Aug. 4, 2006

(65) Prior Publication Data
US 2008/0036660 A1 Feb. 14, 2008

(51) Int. Cl.
*G01S 3/02* (2006.01)
(52) U.S. Cl. .................. 342/464; 342/450; 342/463
(58) Field of Classification Search ................ 342/386, 342/450, 457, 463–465
See application file for complete search history.

(56) References Cited

U.S. PATENT DOCUMENTS

| | | | | |
|---|---|---|---|---|
| 5,381,798 | A * | 1/1995 | Burrows | 600/509 |
| 6,449,558 | B1 | 9/2002 | Small | |
| 2003/0164794 | A1* | 9/2003 | Haynes et al. | 342/353 |
| 2005/0159891 | A1* | 7/2005 | Cohen et al. | 701/213 |
| 2006/0022843 | A1 | 2/2006 | Zimmerman | |
| 2006/0022869 | A1 | 2/2006 | Zimmerman et al. | |
| 2006/0022870 | A1 | 2/2006 | Zimmerman et al. | |
| 2006/0022871 | A1 | 2/2006 | Zimmerman | |
| 2006/0022872 | A1 | 2/2006 | Zimmerman | |

FOREIGN PATENT DOCUMENTS

| | | |
|---|---|---|
| WO | WO 99/63358 | 5/1999 |
| WO | WO 2005/012935 | 2/2005 |

OTHER PUBLICATIONS

U.S. Appl. No. 10/909,140, filed Jul. 30, 2004, Bauregger et al.
U.S. Appl. No. 10/909,184, filed Jul. 30, 2004, Zimmerman et al.
U.S. Appl. No. 10/909,243, filed Jul. 30, 2004, Zimmerman et al.
Barnes, J., et al., "High Precision Indoor and Outdoor Positioning using LocataNet," School of Surveying and Spatial Information Systems, The University of New South Wales, Australia (UNSW).
Barnes, J., et al., "Locata: a New Positioning Technology for High Precision Indoor and Outdoor Positioning," School of Surveying and Spatial Information Systems, The University of New South Wales, Australia (UNSW).

(Continued)

*Primary Examiner*—Dao L Phan
(74) *Attorney, Agent, or Firm*—Perkins Coie LLP

(57) ABSTRACT

A precise positioning method and system is disclosed for allowing an array of ground transmitters to self-survey their relative location at centimeter-level accuracy by transmitting, amongst the ground transmitters in the array, bi-directional ranging signals associated with a wideband code modulation with a chipping rate faster than 30 MHz.

24 Claims, 3 Drawing Sheets

OTHER PUBLICATIONS

Barnes, J., et al., "LocataNet: Intelligent time-synchronised pseudolite transceivers for cm-level stand-alone positioning," Satellite Navigation and Positioning (SNAP) Group, School of Surveying and Spatial Information Systems, The University of New South Wales, Australia (UNSW).

LeMaster, E.Al, "Self-Caliberating Pseudolite Arrays: Theory and Experiment," A dissertation submitted to the Department of Aeronautics and Astronautics, (May 2002).

Matsuoka, M., "Mars Rover Navigation Using Pseudolite Transceiver Arrays: Network-Based Ranging and Extended Self-Calibration Algorithm," A dissertation submitted to the Department of Aeronautics and Astronautics (Mar. 2005).

Trimbel News Release, entitled Trimble Introduces New Surveying Products for the Connected Survey Site, (Oct. 2005).

Barnes, et al. (2003) "High Precision Indoor and Outdoor Positioning Using LocataNet" Journal of Global Positioning Systems (2003) vol. 2, No. 2: pp. 73-82 Accepted Dec. 29, 2003 School of Surveying and Spatial Information Systems, The University of New South Wales, Australia (UNSW).

Barnes, J.B., et al. (2003). "Locatanet: A new positioning technology for high precision indoor and outdoor positioning". *16th Int. Tech. Meeting of the Satellite Division of the U.S. Institute of Navigation*, Portland, Oregon, Sep. 9-12, 2003 pp. 1119-1128.

Barnes, J.B. et al. (2003). "Guidelites: Intelligent synchronized pseudolites for cm-level stand-alone positioning". *11th Int Assoc. of Institutes of Navigation* (*IAIN World Congress*), Berlin, Germany Oct. 21-24, 2003, CD-ROM proc., paper 202.

\* cited by examiner

SELF-SURVEYING WIDEBAND GROUND TRANSMITTERS

TECHNICAL FIELD

The present invention is directed to precise local positioning systems, and more particularly to a method and system for self-surveying of ground transmitters.

BACKGROUND

Local positioning systems that employ a set of ground transmitters (pseudolites) require pre-survey of the location of each of the ground transmitters at a centimeter-level of accuracy for initializing the precise positioning capabilities of each ground transmitter. The precise relative or absolute positioning of ground transmitters often requires surveying techniques that employ GPS Real Time Kinematic (RTK) solutions. However, a GPS RTK solution may not be possible when ground transmitters are placed at locations with poor or no access to GPS satellites. For example, a GPS RTK solution may not be achievable in a mining pit.

According to another approach, the location of a given ground transmitter can be determined using information on the geometric motion of an array of ground transmitters. However, such an approach requires the ground transmitters to move relative to each other for self-surveying of their relative locations.

According to another approach, ground transmitters can self-survey their locations by tracking each other's multi-frequency carrier signals for resolving integer biases in a cascaded manner with little or no geometric motion information. However, the ground transmitters are required to transmit and track multi-frequency carrier signals, which adds to undesired complexity.

Thus, in view of the above problems, there is a need for a method and system to allow ground transmitters to self-survey their location at a centimeter-level of accuracy without resorting to requiring geometric motion information on the ground transmitters and without requiring the ground transmitters to transmit and track multi-frequency carrier signals.

SUMMARY OF THE INVENTION

According to one aspect of certain non-limiting embodiments, a position solution can be determined using an array of ground transmitters. Each ground transmitter of the array is capable of self-surveying its own location relative to the location of other ground transmitters in the array by generating ranging signals associated with a wideband code modulation with a chipping rate of faster than 30 MHz, and by tracking other ranging signals generated by the other ground transmitters in the array.

DETAILED DESCRIPTION

Figure 1:
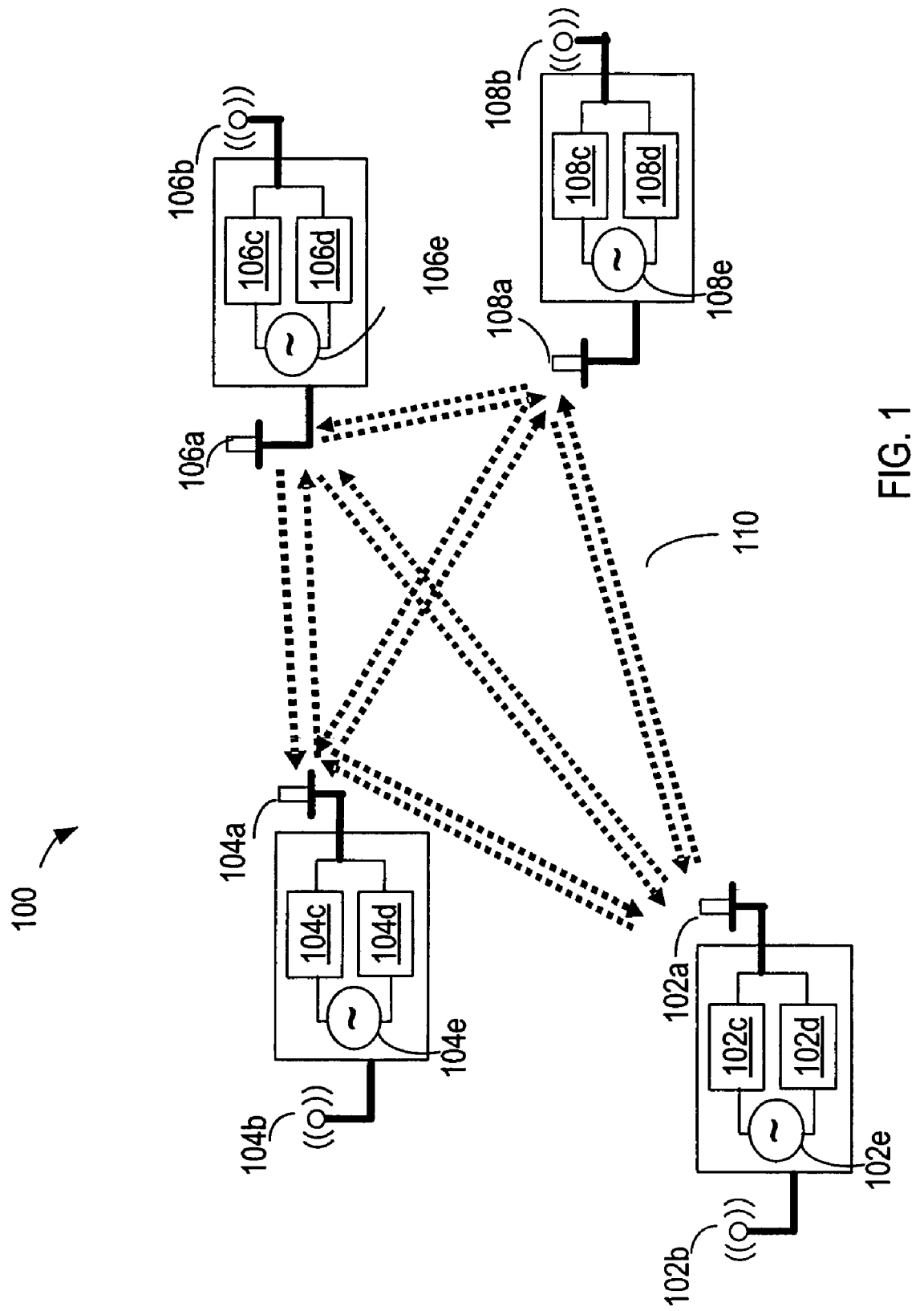
FIG. 1 is a high-level block diagram that illustrates an array of ground transmitters, according to certain non-limiting embodiments.

FIG. 1 is a high-level block diagram that illustrates an array of ground transmitters, according to certain embodiments. FIG. 1 shows an array 100 of ground transmitters 102, 104, 106, and 108. Each ground transmitter includes a transceiver antenna, such as transceiver antennas 102a, 104a, 106a, and 108a. The transceiver antennas are capable of both receiving and transmitting ranging signals. Further, each ground transmitter comprises: 1) an optional wireless data modem, such as modems 102b, 104b, 106b, and 108b, 2) a transmitter section, such as transmitter sections 102c, 104c, 106c, and 108c, 3) a receiver section, such as receiver sections 102d, 104d, 106d, and 108d, and 4) a single common oscillator clock, such as clocks 102e, 104e, 106e, and 108e.

Each ground transmitter in array 100 can transmit and receive wideband signals 110. According to certain embodiments, the receiver section and the transmitter section of each ground transmitter of array 100, are clocked by the single common oscillator clock, such as clocks 102e, 104e, 106e, and 108e.

In an array of two ground transmitters, each ground transmitter is capable of determining their relative distance to the other ground transmitter in the array. In an array of three ground transmitters, each ground transmitter is capable of determining its 2-D location. If an array of at least four ground transmitters is deployed over a local area of interest, the ground transmitters are capable of determining their 3-D relative locations, and together, the ground transmitters in the array can provide a 3-D positioning solution to a given rover.

In the case of an array with more than four ground transmitters, it is not necessary for all the ground transmitters to have line of sight (LOS) to all the other ground transmitters in the array. If a particular ground transmitter in the array has LOS to at least three other ground transmitters in the array, then the particular ground transmitter can be self-surveyed relative to the ground transmitters that are in the line of sight.

Figure 2:
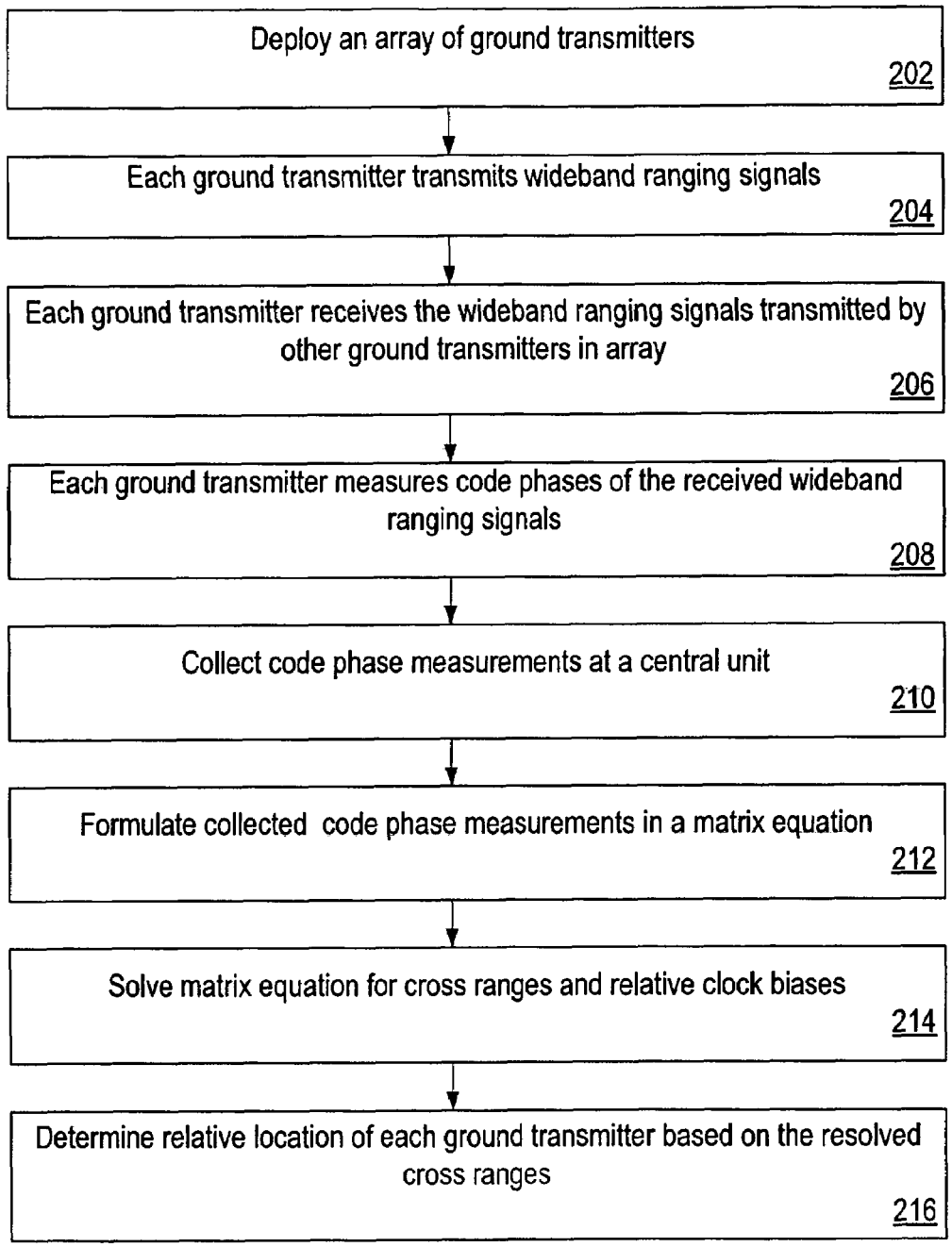
FIG. 2 is a flowchart that illustrates some high-level steps for implementing a self-survey of an array of ground transmitters, according to certain non-limiting embodiments.

FIG. 2 is a flowchart that illustrates some high-level steps for implementing a self-survey of an array of ground transmitters, according to certain non-limiting embodiments.

At block 202 of FIG. 2, an array of ground transmitters is deployed over a local area of interest. Each ground transmitter in the array is capable of transmitting and receiving wideband ranging signals with a chipping rate that is faster than 30 MHz. At block 204, each ground transmitter in the array transmits a wideband signal. At block 206, each ground transmitter in the array receives wideband signals that are transmitted by other ground transmitters in the array, and which are in the line of sight of the corresponding receiving ground transmitter.

At block 208, each ground transmitter that has received wideband ranging signals measures the code phases of the received wideband ranging signals. At block 210, the code phase measurements measured by the ground transmitters are collected at a central unit. The central unit may reside in one of the ground transmitters in the array, according to certain embodiments. In other embodiments, the central unit may reside elsewhere.

At block 212, the collected phase measurements are used in formulating a matrix equation. The formulation of such a matrix equation is described in greater detail herein. At block 214, the matrix equation of block 212 is solved for cross ranges and/or relative clock biases. The solution of such a matrix equation is described in greater detail herein. At block 216, the relative location of each ground transmitter can be determined based on the resolved cross ranges.

Thus, the array of ground transmitters as described with reference to FIG. 1 and FIG. 2 allows each ground transmitter in the array to perform a self-survey of its location relative to the location of other ground transmitters.

The code phase measurements that are measured by the ground transmitters in the array include information on cross ranges and clock biases. For example, in an array comprising four ground transmitters, such as in FIG. 1, the code phase measurements of the four ground transmitters can be mathematically modeled as illustrated below.

Code phase measurements at ground transmitter, GT1, can be modeled mathematically as:

$$\Phi_1^2 = R^{1-2} + T^2 - T^1 + \epsilon_1^2$$

$$\Phi_1^3 = R^{1-3} + T^3 - T^1 + \epsilon_1^3$$

$$\Phi_1^4 = R^{1-4} + T^4 - T^1 + \epsilon_1^4$$

where, $\Phi_1^2$: Code phase of signal transmitted by GT2 and measured at GT1
$\Phi_1^3$: Code phase of signal transmitted by GT3 and measured at GT1
$\Phi_1^4$: Code phase of signal transmitted by GT4 and measured at GT1
$R^{1-2}$: Cross range between GT1 and GT2
$R^{1-3}$: Cross range between GT1 and GT3
$R^{1-4}$: Cross range between GT1 and GT4
$T^1$: Clock bias of GT1
$T^2$: Clock bias of GT2
$T^3$: Clock bias of GT3
$T^4$: Clock bias of GT4
$\epsilon_1^2$: Noise of signal transmitted by GT2 and measured at GT1
$\epsilon_1^3$: Noise of signal transmitted by GT3 and measured at GT1
$\epsilon_1^4$: Noise of signal transmitted by GT4 and measured at GT1

The noise ($\epsilon$) includes line biases that may be pre-calibrated.

Code phase measurements at ground transmitter, GT2, can be modeled mathematically as:

$$\Phi_2^1 = R^{1-2} + T^1 - T^2 + \epsilon_2^1$$

$$\Phi_2^3 = R^{2-3} + T^3 - T^2 + \epsilon_2^3$$

$$\Phi_2^4 = R^{2-4} + T^4 - T^2 + \epsilon_2^4$$

where, $\Phi_2^1$: Code phase of signal transmitted by GT1 and measured at GT2
$\Phi_2^3$: Code phase of signal transmitted by GT3 and measured at GT2
$\Phi_2^4$: Code phase of signal transmitted by GT4 and measured at GT2
$R^{1-2}$: Cross range between GT1 and GT2
$R^{2-3}$: Cross range between GT2 and GT3
$R^{2-4}$: Cross range between GT2 and GT4
$T^1$: Clock bias of GT1
$T^2$: Clock bias of GT2
$T^3$: Clock bias of GT3
$T^4$: Clock bias of GT4
$\epsilon_2^1$: Noise of signal transmitted by GT1 and measured at GT2
$\epsilon_2^3$: Noise of signal transmitted by GT3 and measured at GT2
$\epsilon_2^4$: Noise of signal transmitted by GT4 and measured at GT2

Code phase measurements at ground transmitter, GT3, can be modeled mathematically as:

$$\Phi_3^1 = R^{1-3} + T^1 - T^3 + \epsilon_3^1$$

$$\Phi_3^2 = R^{2-3} + T^2 - T^3 + \epsilon_3^2$$

$$\Phi_3^4 = R^{3-4} + T^4 - T^3 + \epsilon_3^4$$

where, $\Phi_3^1$: Code phase of signal transmitted by GT1 and measured at GT3
$\Phi_3^2$: Code phase of signal transmitted by GT2 and measured at GT3
$\Phi_3^4$: Code phase of signal transmitted by GT4 and measured at GT3
$R^{1-3}$: Cross range between GT1 and GT3
$R^{2-3}$: Cross range between GT2 and GT3
$R^{3-4}$: Cross range between GT3 and GT4
$T^1$: Clock bias of GT1
$T^2$: Clock bias of GT2
$T^3$: Clock bias of GT3
$T^4$: Clock bias of GT4
$\epsilon_3^1$: Noise of signal transmitted by GT1 and measured at GT3
$\epsilon_3^2$: Noise of signal transmitted by GT2 and measured at GT3
$\epsilon_3^4$: Noise of signal transmitted by GT4 and measured at GT3

Code phase measurements at ground transmitter, GT4, can be modeled mathematically as:

$$\Phi_4^1 = R^{1-4} + T^1 - T^4 + \epsilon_4^1$$

$$\Phi_4^2 = R^{2-4} + T^2 - T^4 + \epsilon_4^2$$

$$\Phi_4^3 = R^{3-4} + T^3 - T^4 + \epsilon_4^3$$

where, $\Phi_4^1$: Code phase of signal transmitted by GT1 and measured at GT4
$\Phi_4^2$: Code phase of signal transmitted by GT2 and measured at GT4
$\Phi_4^3$: Code phase of signal transmitted by GT3 and measured at GT4
$R^{1-4}$: Cross range between GT1 and GT4
$R^{2-4}$: Cross range between GT2 and GT4
$R^{3-4}$: Cross range between GT3 and GT4
$T^1$: Clock bias of GT1
$T^2$: Clock bias of GT2
$T^3$: Clock bias of GT3
$T^4$: Clock bias of GT4
$\epsilon_4^1$: Noise of signal transmitted by GT1 and measured at GT4
$\epsilon_4^2$: Noise of signal transmitted by GT2 and measured at GT4
$\epsilon_4^3$: Noise of signal transmitted by GT3 and measured at GT4

The network-based approach allows the formulation of all the code phase measurements from the array of ground transmitters into a single matrix as follows:

$$\begin{bmatrix} \Phi_1^2 \\ \Phi_1^3 \\ \Phi_1^4 \\ \Phi_2^1 \\ \Phi_2^3 \\ \Phi_2^4 \\ \Phi_3^1 \\ \Phi_3^2 \\ \Phi_3^4 \\ \Phi_4^1 \\ \Phi_4^2 \\ \Phi_4^3 \end{bmatrix} = \begin{bmatrix} 1 & 0 & 0 & 0 & 0 & 0 & -1 & 1 & 0 & 0 \\ 0 & 1 & 0 & 0 & 0 & 0 & -1 & 0 & 1 & 0 \\ 0 & 0 & 1 & 0 & 0 & 0 & -1 & 0 & 0 & 1 \\ 1 & 0 & 0 & 0 & 0 & 0 & 1 & -1 & 0 & 0 \\ 0 & 0 & 0 & 1 & 0 & 0 & 0 & -1 & 1 & 0 \\ 0 & 0 & 0 & 0 & 1 & 0 & 0 & -1 & 0 & 1 \\ 0 & 1 & 0 & 0 & 0 & 0 & 1 & 0 & -1 & 0 \\ 0 & 0 & 0 & 1 & 0 & 0 & 0 & 1 & -1 & 0 \\ 0 & 0 & 0 & 0 & 1 & 0 & 0 & 0 & -1 & 1 \\ 0 & 0 & 1 & 0 & 0 & 0 & 1 & 0 & 0 & -1 \\ 0 & 0 & 0 & 0 & 1 & 0 & 0 & 1 & 0 & -1 \\ 0 & 0 & 0 & 0 & 0 & 1 & 0 & 0 & 1 & -1 \end{bmatrix} \begin{bmatrix} R^{1-2} \\ R^{1-3} \\ R^{1-4} \\ R^{2-3} \\ R^{2-4} \\ R^{3-4} \\ T^1 \\ T^2 \\ T^3 \\ T^4 \end{bmatrix} + \varepsilon$$

$$\Rightarrow \Phi = A \begin{bmatrix} R \\ T \end{bmatrix} + \varepsilon$$

The above matrix equation can be solved for cross ranges and relative clock biases as follows:

$$\begin{bmatrix} R^{1-2} \\ R^{1-3} \\ R^{1-4} \\ R^{2-3} \\ R^{2-4} \\ R^{3-4} \\ T^2 - T^1 \\ T^3 - T^1 \\ T^4 - T^1 \end{bmatrix} = \begin{bmatrix} I & 0 & 0 & 0 & 0 \\ 0 & -1 & 1 & 0 & 0 \\ 0 & -1 & 0 & 1 & 0 \\ 0 & -1 & 0 & 0 & 1 \end{bmatrix} pinv(A) \Phi$$

The code-based cross ranges and relative clock biases are observable at each measurement epoch. The use of wideband signals can provide the accuracy of code-based cross ranges at about 15 cm in typical multi-path environments. Averaging may help achieve better accuracy.

Once all the cross ranges are resolved, the relative locations of the ground transmitters can be determined in local array fixed coordinates. For example, local Cartesian coordinates are defined as the first ground transmitter at the origin, the second ground transmitter on the X-axis, the third ground transmitter on the X-Y plane with positive Y. If needed, the local coordinates can be mapped to other coordinates (e.g., GPS WGS84) when at least three of the ground transmitters are determined in the desirable coordinates.

If the ground transmitters need to be synchronized, the estimate of the relative clocks ($T^i - T^j$) can be used as feedback to steer the relative clock biases to zero.

Figure 3:
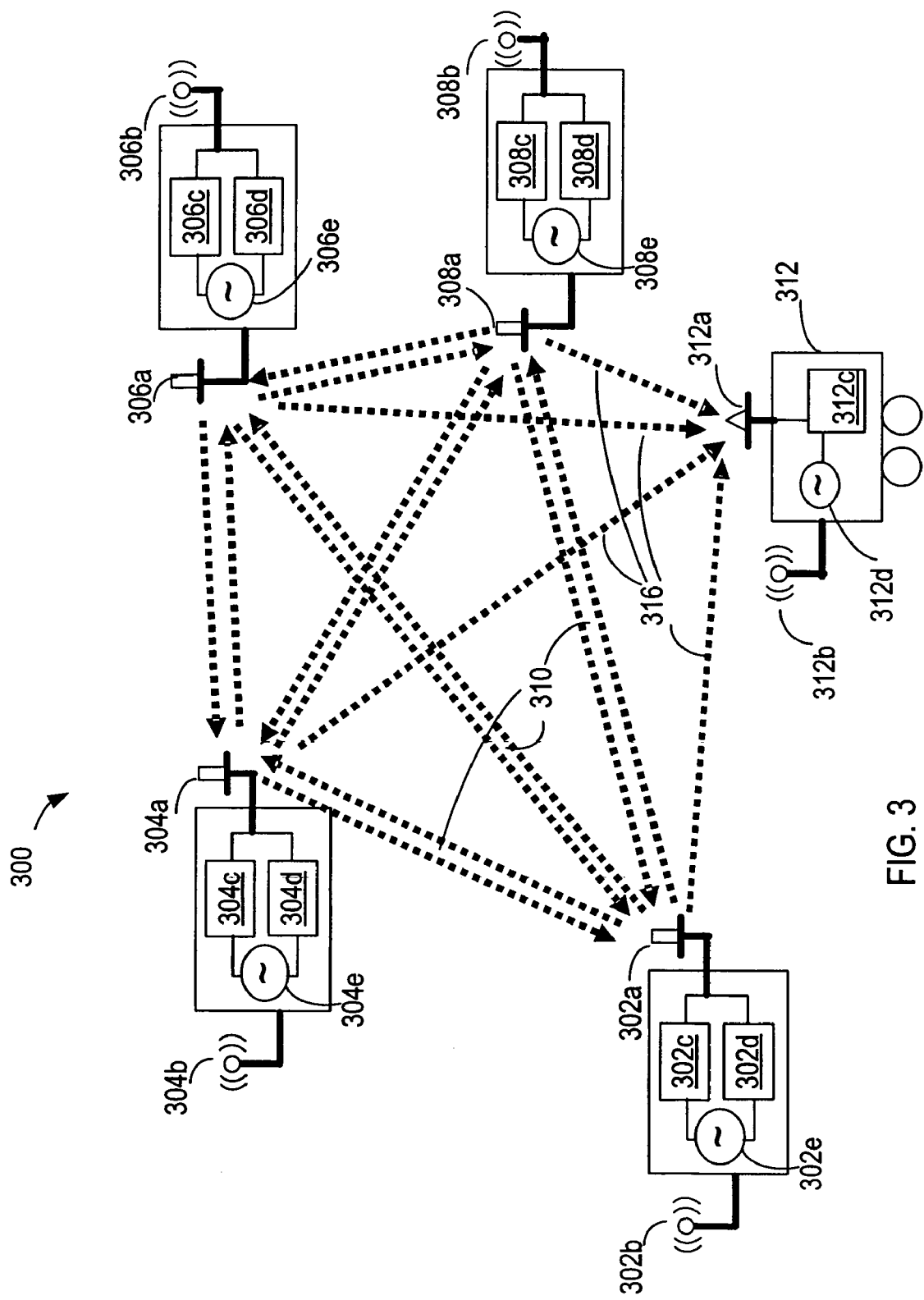
FIG. 3 is a block diagram that illustrates an array of self-surveyed ground transmitters providing a positioning solution to a rover by broadcasting the self-surveyed locations of the ground transmitters and the relative clock bias estimates to the rover, according to certain non-limiting embodiments.

The relative clock bias estimate can be broadcast to rovers for transmitter clock bias corrections, as described herein with reference to FIG. 3. In other words, there is no requirement for a separate reference station in the rover's proximity for conventional differential correction.

FIG. 3 is a block diagram that illustrates an array of self-surveyed ground transmitters that provide a positioning solution to a rover by broadcasting the self-surveyed locations of the ground transmitters and the relative clock bias estimates to the rover, according to certain non-limiting embodiments. Various techniques may be used to broadcast such information to a rover. One such technique is described in U.S. patent application entitled, "PRECISE LOCAL POSITIONING SYSTEMS USING GROUND-BASED TRANSMITTERS" filed by Masayoshi Matsuoka, Kurt R. Zimmerman, Paul Y. Montgomery, and David G. Lawrence on Feb. 22, 2006, the contents of which are incorporated herein by reference.

FIG. 3 shows an array 300 of ground transmitters 302, 304, 306, 308 and a rover 312. Rover 312 comprises a receiver antenna 312a, a data modem 312b, a receiver section 312c and a clock 312d. According to certain embodiments, rover 312 can transmit wideband ranging signals. In such a case, the rover would include a transmitter and a transceiver antenna.

Each ground transmitter includes a transceiver antenna, such as transceiver antennas 302a, 304a, 306a, and 308a. The transceiver antennas are capable of both receiving and transmitting ranging signals. Further, each ground transmitter comprises: 1) an optional wireless data modem, such as modems 302b, 304b, 306b, and 308b, 2) a transmitter section, such as transmitter sections 302c, 304c, 306c, and 308c, 3) a receiver section, such as receiver sections 302d, 304d, 306d, and 308d, and 4) a clock, such as 302e, 304e, 306e, and 308e. Each ground transmitter broadcasts clock bias estimates 316 to rover 312 as correction data. Further, each ground transmitter in array 300 can transmit and receive wideband ranging signals 310. According to certain embodiments, the receiver section and the transmitter section of each ground transmitter of array 300, are clocked by a single common oscillator clock, such as clocks 302e, 304e, 306e, and 308e.

In the foregoing specification, embodiments of the invention have been described with reference to numerous specific details that may vary from implementation to implementation. The specification and drawings are, accordingly, to be regarded in an illustrative rather than a restrictive sense. The invention is intended to be as broad as the appended claims, including all equivalents thereto.

The invention claimed is:

1. A system for determining position, said system comprising:
    an array of ground transmitters, said array having at least two ground transmitters,
    wherein said ground transmitters in said array are operable to generate ranging signals associated with a wideband code modulation with a chipping rate at a frequency that is substantially greater than 30 MHz, and wherein one or more of said ground transmitters comprise a receiving module, the receiving module being operable to receive other ranging signals associated with other ground transmitters in said array, and
    wherein the one or more of said ground transmitters in said array is adapted for self-surveying their locations relative to corresponding locations of at least one other ground transmitter in said array.

2. The system of claim 1, wherein a measured phase information of said ranging signals associated with a wideband code modulation with a chipping rate faster than 30 MHz is used to solve a relative clock difference between said at least two ground transmitters in said array.

3. The system of claim 2, wherein said at least two ground transmitters in said array are operable to be synchronized to minimize said relative clock difference.

4. The system of claim 1, wherein one or more ground transmitters in said array are operable to track one or more satellites.

5. The system of claim 1, wherein said array comprises at least four ground transmitters surveyed in other desired coordinates for translating from local coordinates defined by said array to said other desired coordinates.

6. The system of claim 1, further comprising a rover that is operable to track one or more ground transmitters of said array and is further operable to determine one or more of: a position of said rover relative to said array and a clock offset of said rover relative to a corresponding clock of any ground transmitters in said array.

7. The system of claim 6, wherein said rover is operable to track one or more satellites.

8. The system of claim 6, wherein said at least two ground transmitters are operable to broadcast said self-surveyed location information to said rover.

9. The system of claim 6, wherein a particular transmitter of the array of transmitters is operable to transmit measured phases of said ranging signals of said at least one other transmitter of said array to said rover.

10. The system of claim 6, wherein said rover is operable to use carrier phase information generated by said at least two ground transmitters to refine position accuracy of said rover.

11. The system of claim 6, wherein said at least two ground transmitters are operable to track said rover.

12. A method for determining position, said method comprising:
generating, by one or more ground transmitters in an array of ground transmitters, ranging signals associated with a wideband code modulation with a chipping rate faster than 30 MHz,
receiving, by said one or more ground transmitters in said array, other ranging signals of one or more other ground transmitters in said array; and
wherein said one or more ground transmitters in said array is adapted for self-surveying its location relative to locations corresponding to said one or more other ground transmitters in said array.

13. The method of claim 12, further comprising adding an additional ground transmitter in said array, wherein said additional ground transmitter is adapted for self-surveying its corresponding location relative to said locations corresponding to said one or more other ground transmitters in said array.

14. The method of claim 12, further comprising collecting measured phase information of said ranging signals associated with a wideband code modulation with a chipping rate at a frequency that is substantially greater than 30 MHz from said one or more ground transmitters in said array at a central repository and using said measured phase information for solving cross ranges amongst ground transmitters in said array.

15. The method of claim 14, further comprising solving for relative clock biases amongst at least two ground transmitters in said array.

16. The method of claim 15, further comprising synchronizing at least two ground transmitters in said array for minimizing said relative clock biases.

17. The method of claim 12, wherein one or more ground transmitters in said array track one or more satellites.

18. The method of claim 12, further comprising using a rover that tracks one or more ground transmitters in said array and that determines one or more of: a position of said rover relative to one or more ground transmitters of said array of ground transmitters and a clock offset of said rover relative to a corresponding clock of any ground transmitter in said array.

19. The method of claim 18, further comprising tracking of one or more satellites by said rover.

20. The method of claim 18, further comprising broadcasting, by said at least two ground transmitters, said self-surveyed location information to said rover.

21. The method of claim 18, further comprising broadcasting, by said at least two ground transmitters, measured phase information of said ranging signals of said at least one other transmitter of said array to said rover.

22. The method of claim 18, further comprising using, by said rover, carrier phase information generated by said at least two ground transmitters to refine position accuracy of said rover.

23. The method of claim 18, further comprising tracking said rover by said at least two ground transmitters.

24. The method of claim 12, further comprising using at least four ground transmitters in said array for translating, from local coordinates defined by said array, to other desired coordinates.

* * * * *